Figure 1:
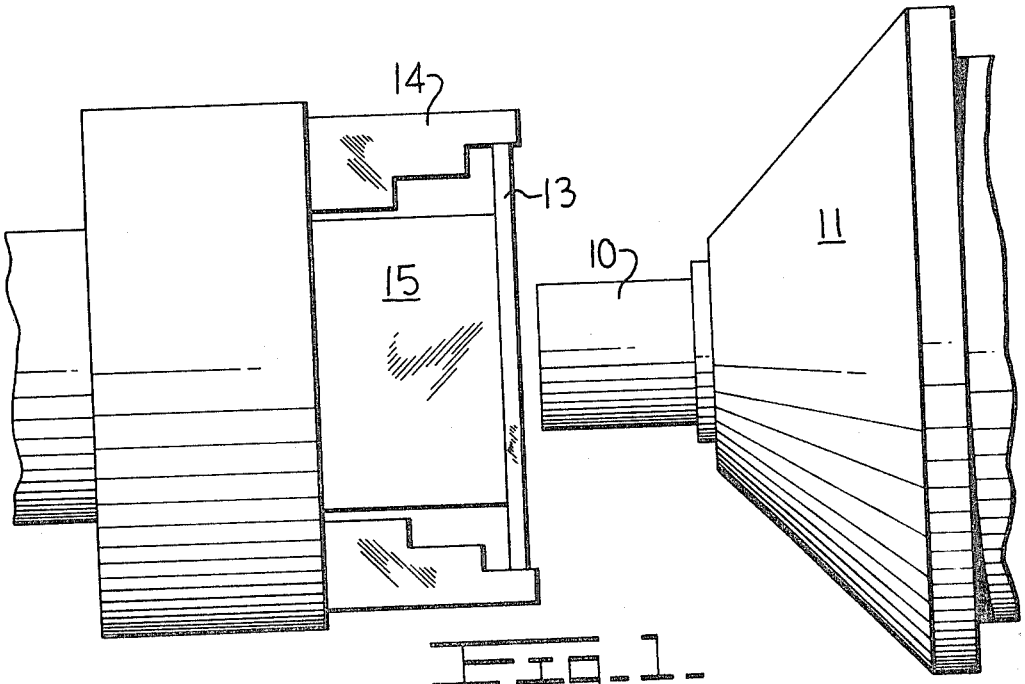
Figure 2:
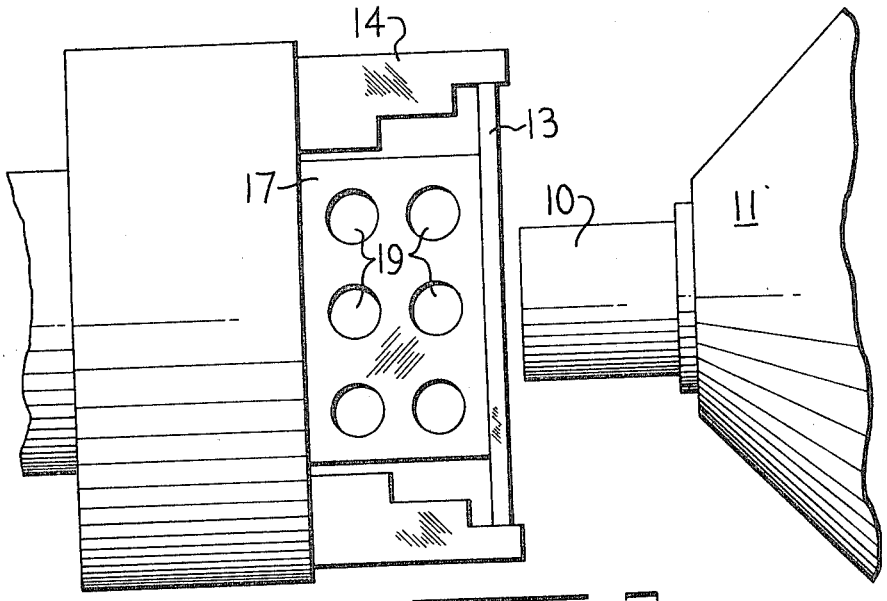
Figure 3:
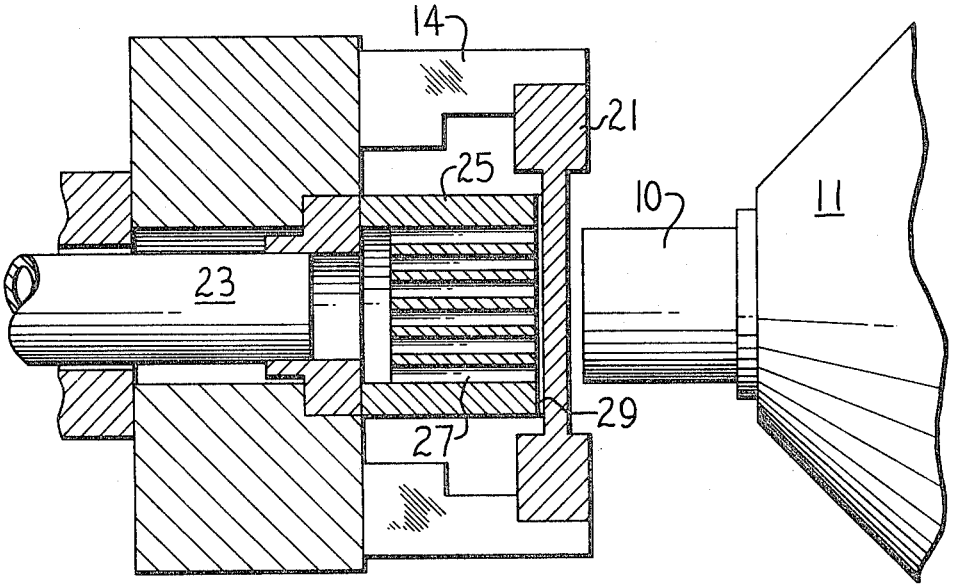
Figure 4:
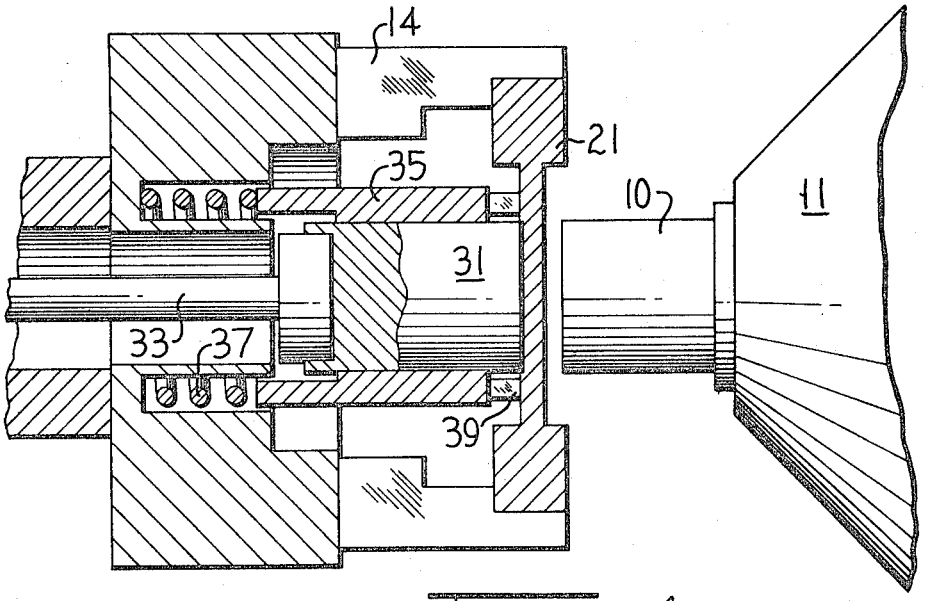

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 27, 1973

908 O.G. 788

T908,002
METHOD OF BONDING A MEMBER TO A THIN PLATE

Calvin D. Loyd, 5029 Melody Lane, Peoria, Ill. 61604

Filed June 1, 1971, Ser. No. 148,343
Int. Cl. B23k *27/00*
U.S. Cl. 29—470.3
2 Sheets Drawing. 10 Pages Specification

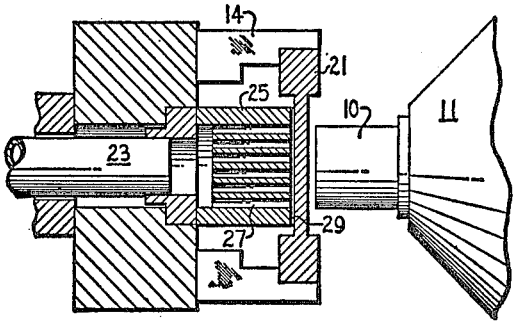

Method of friction bonding a thick section member to a thin section member, such as a thin plate or sheet, wherein a heat conductor is applied to one side of the thin section member for cooling purposes while the other side of said member heats to bonding temperature along with the mating surface of the larger section member.

The heat conductor may be a block of high heat conducting material, a perforated member having a fluid coolant flowing therethrough, a member which directs a flow of fluid coolant against the backside of the thin section member, or a member having a low melting point. The member having a low melting point is held in contact with the thin section member by a ram and surrounded by a floating sleeve which is also urged against the thin section member and has an end slotted whereby, when the heat conducting member having a low melting point melts, the melted material flows radially outwardly through the slots and the ram continues to force the member into contact with the workpiece where it continues to melt, cooling the workpiece by the heat of fusion.

March 27, 1973 C. D. LOYD T908,002

METHOD OF BONDING A MEMBER TO A THIN PLATE

Filed June 1, 1971 2 Sheets-Sheet 1

INVENTOR
CALVIN D. LOYD

BY
Fryer, Tjensvold, Feix, Phillips & Lempio
ATTORNEYS

METHOD OF BONDING A MEMBER TO A THIN PLATE

Filed June 1, 1971 2 Sheets-Sheet 2

INVENTOR
CALVIN D. LOYD

BY
Fryer, Tjensvold, Feix, Phillips & Lempio
ATTORNEYS